United States Patent [19]

Madsen et al.

[11] 4,314,829

[45] Feb. 9, 1982

[54] PARTICULATE FILTER METHOD

[75] Inventors: James B. Madsen, Marietta; Daniel R. Brown, Atlanta, both of Ga.

[73] Assignee: International Minerals & Chemical Corporation, Terre Haute, Ind.

[21] Appl. No.: 163,448

[22] Filed: Jun. 26, 1980

[51] Int. Cl.³ ............................................. B01D 43/30
[52] U.S. Cl. ..................................... 55/98; 71/64.13; 71/61; 55/512
[58] Field of Search ........................ 55/98, 99, 97, 474, 55/479, 512; 141/93; 71/64.12, 64.13, 33, 61, 64.15

[56] References Cited

U.S. PATENT DOCUMENTS

| | | | |
|---|---|---|---|
| 2,834,119 | 5/1958 | Schaub | 55/474 |
| 3,738,821 | 6/1973 | Barber | 71/64.15 |
| 3,812,889 | 5/1974 | Strehlow | 141/93 |
| 3,861,889 | 0/1975 | Takae et al. | 55/70 |
| 3,982,043 | 9/1976 | Simpson | 55/103 |
| 3,998,933 | 12/1976 | Henderson et al. | 55/98 |
| 4,076,509 | 2/1978 | Ferm | 55/479 |
| 4,220,478 | 9/1980 | Schuff | 55/99 |

OTHER PUBLICATIONS

Bonn, David E., Proc. Ann. Meet., Fert. Ind. Round Table, 15th Washington, D.C., pp. 44-47 (Eng.), 1965.
Baker, Dale E. et al., Compost Science 16(4):28-30 (Eng.), 1975.

*Primary Examiner*—Bernard Nozick
*Attorney, Agent, or Firm*—H. J. Barnett

[57] ABSTRACT

A particulate filter medium for collecting finely dispersed particles from a circulating gas stream. The filter medium comprises a gas flow zone consisting essentially of gas permeable particles of the same material as the finely dispersed solid particles to be collected. The finely dispersed particles are generated by granular product blending operations of dry granular materials such as fertilizers, chemicals, animal feeds and clays.

A substantial saving in filter material renewal costs is realized by adding the spent filter medium to the product stream, and simply replacing the spent filter medium with fresh, granular particles of the product having a capacity to collect finely dispersed solid particles from the circulating gas stream.

10 Claims, No Drawings

PARTICULATE FILTER METHOD

BACKGROUND OF THE INVENTION

1. Field

Dry granular fertilizer blending operations, dry animal feed blending, dry granular chemical blending and granular blending operations, in general, all have a common problem, namely, air contamination from finely dispersed particles of the materials being handled. Such finely dispersed dusts can be a source of inconvenience and irritation to the human operators of the facility, a possible combustion or explosion hazard in the case of some materials, and, in any event, a substantial loss of product if the dispersed materials are discarded as a waste material as is done with conventional spent filter media.

2. Prior Art

The problems associated with fine dusts suspended in the air in dry fertilizer are well known. Three general types of dust collectors have been in use: medium pressure drop wet collectors, cloth shakers (continuous) and venturis (high pressure wet collectors). See Bonn, David E., *Proc. Ann Meet., Fert. Ind. Round Table*, 15th, Washington, D.C., pages 44-7 (Eng.), 1965.

U.S. Pat. No. 3,861,889 issued Jan. 21, 1975, describes a dust filter system for use in fertilizer plants in which a gas stream is sprayed with a solvent and passed through a solvent-wetted layer of foamed material (ether type polyurethane foam resin) having a noncellular porosity of over 90%. In such a system the trapped dust particles represent a loss, and the added solvent adds a cost to the dust removal process. In other prior commercial systems, the product was sprayed with an oil to keep dust down. However, spraying is becoming too expensive because oil costs have skyrocketed.

Baker, et al have suggested that kiln dust from cement factories can be used to replace hydrated lime in a vacuum filter process for treating sewage sludge. See Baker, Dale E. et al, *Compost Sci.* 16(4):28-30 (Eng.) 1975. It was suggested here that the filter cake or effluent from the vacuum filtration process could then be used as sources of nutrients for crop production.

None of the above references disclose the use of a granular filter medium consisting essentially of the same material which is suspended in the gaseous atmosphere to collect the suspended particles and purify the atmosphere. This granular material, when laden with trapped particles can then be added to the product stream, resulting in substantial product savings.

SUMMARY

The subject invention is based on the surprising discovery that a granular particulate material consisting essentially of the same compounds as those causing the finely dispersed dust particles contaminating a gaseous atmosphere is an efficient and effective filter medium to remove the finely dispersed dust particles from the gaseous atmosphere. More particularly, it has been discovered that a granular fertilizer, which may comprise potash, is an effective filter medium in a fertilizer blending plant to remove the finely divided dust particules (of fertilizer) from the air. The dust-laden air is drawn through a filter bed of the granulated potash. The filter bed removes the fertilizer dust particles from the air just as efficiently as a conventional bag filter, a cyclone or a wet scrubber, and results in a substantial economy over extended periods of blending operations, because the spent filter medium can be added to the product output, and the spent filter medium is simply replaced with fresh granular fertilizer (potash). Dust removal efficiency of about 98% has been obtained with the subject dust filter system.

The dust filter system of the subject invention can be used in combination with other air purification devices to supplement or enhance their effectiveness. For example, dust-laden air may be withdrawn into a plenum outlet by means of a dust fan which discharges the contaminated air into a primary cyclone collector having heated surfaces. Such cyclones are capable of removing up to about 80% of the suspended dust particles larger than 20 microns. The cyclone discharges into a dust filter, and the partially cleaned air passes through the granular potash filter medium to remove up to about 98% by weight of the dust particles originally suspended in the contaminated air prior to the above treatment.

PREFERRED EMBODIMENT

The following example is illustrative of a specific application of the invention. About fifty-four pounds of fresh, granular potash is disposed in a filter box having an inlet and outlet conduit to enable a dust-laden air stream to flow therethrough. The discharge side of a filter system blower communicates with the inlet side of the filter box. Suitable ducts are provided to discharge or recirculate the purified air.

With the above filter system, an average velocity pressure measured with a 2-inch inclined manometer was 1.49 inch. The air volume in the system was calculated to be 32.6 CFM (cubic feet/minute), and the static air pressure at the inlet to the filter box was about 2 inches.

Dust-laden air at 1.5 grains of dust per cubic foot at a flow rate of 32.6 CFM was fed to the filter unit for a 60 minute test (2934 grains total). The dust particle size distribution was:

| U.S. Standard Screen | % by Weight Total Dust Particles |
| --- | --- |
| −325 | 8.3 |
| +325 to −200 | 6.5 |
| +200 to −100 | 11.2 |
| +100 to −40 | 21.6 |
| +40 | 52.4 |
| | 100 |

The dust removal efficiency measured for the subject 60 minute test was 98% by weight of the total dust particles. As the test progressed, it was also noted that the filter box inlet air pressure increased at a steady rate, showing continued effectiveness in trapping and collecting dust particles from the dust-laden air stream passing through the filter box. When the static pressure levels off at a peak or maximum value it indicates a decreased effectiveness of the filter medium, and the spent filter medium is removed from the filter box, added to fertilizer product, and fresh granular filter medium is disposed in the filter box. The cycle of replacement is repeated as often as necessary to maintain air purification at the required level.

In at least one embodiment in which the subject filter system has been used successfully, the granular, blended fertilizer product comprises about: 20-40% of a potassium-containing material, such as muriate or sulfate of potash; 20-30% of a phosphorus-containing material, such as acid phosphate, mono- or diammonium phosphate or triple superphosphate; and the balance, a nitrogen-containing material, such as ammonium nitrate, ammonium sulfate or urea. In this particular example, granular muriate of potash is the filter medium. A supply of heated air is provided to the filter medium to prevent caking. The filter medium removed the product dust from the air circulated through the filter. When the absorption capacity of the filter medium becomes exhausted, it is replaced with fresh granular muriate of potash, and the used muriate of potash is blended in with the fertilizer product.

The Tyler Standard Screen analysis of the filter medium is:

| Tyler Mesh | Opening | Range % |
| --- | --- | --- |
| +6 to 8 | 3.36 to 2.38 mm | 5–25 |
| +8 to 10 | 2.38 to 1.68 mm | 35–70 |
| +10 to 14 | 1.68 to 1.19 mm | 65–73 |
| +14 to 20 | 1.19 mm to 841 microns | 87–99 |
| +20 to 28 | 841 microns to 595 microns | 97–100 |

The process of using one or more of the same materials being blended as a filter medium provides a distinct commercial advantage because the spent filter medium is added to the product. Such filter medium is surprisingly effective in trapping and removing the finely dispersed, particulate product material from the surrounding atmosphere and thereby obtains the additional saving realized by putting the air-entrained product into the blending plant's product output.

We claim:

1. In a method of removing finely dispersed, particulate material suspended in a gaseous atmosphere in a facility for making a blended solid, granular fertilizer product consisting essentially of inorganic salts selected from the group consisting of phosphorus, potassium and nitrogen and mixture thereof, said finely dispersed, particulate material being generated from the product being blended during blending, the improvement comprising the step of circulating the gaseous atmosphere having finely dispersed, particulate material suspended therein through a dry filter bed consisting essentially of dry, gas permeable particles of at least one inorganic salt component of the blended solid, granular fertilizer product.

2. The method of claim 1, including the step of replacing spent filter medium with fresh filter medium comprising at least one of the components of the blended product.

3. The method of claim 1, including the step of adding spent filter medium to the blended product stream, and replacing the spent filter medium with fresh, granular, blended product capable of removing at least 90% by weight of the entrained particulate materials from the gaseous atmosphere.

4. The method of claim 1, in which the blended, solid granular product is a dry granular, solid fertilizer product.

5. The method of claim 4, in which the filter medium consists essentially of the fertilizer product being blended, and including the step of circulating heated air through said filter medium to prevent caking.

6. The method of claim 4, including the prefiltering step of passing the gaseous atmosphere having finely dispersed particulate material suspended therein through a heated cyclone separator to reduce the amount of finely dispersed particulate material suspended in the gaseous atmosphere.

7. The method of claim 4, in which the filter medium consists essentially of a dry fertilizer-grade potassium-containing material selected from the group consisting of muriate of potash, sulfate of potash and mixtures thereof.

8. The method of claim 7, in which the filter medium particles have a Tyler Standard Screen analysis of:

| Tyler Mesh | Opening | Range % |
| --- | --- | --- |
| +6 to 8 | 3.36 to 2.38 mm | 5–25 |
| +8 to 10 | 2.38 to 1.68 mm | 35–70 |
| +10 to 14 | 1.68 to 1.19 mm | 65–73 |
| +14 to 20 | 1.19 mm to 841 microns | 87–99 |
| +20 to 28 | 841 microns to 595 microns | 97–100 |

9. The method of claim 4, in which the finely dispersed particulate material suspended in the gaseous atmosphere has a dust particle size distribution U.S. Standard Screen analysis of:

| U.S. Standard Screen | % of Total |
| --- | --- |
| −325 | 8.3 |
| +325 to −200 | 6.5 |
| +200 to −100 | 11.2 |
| +100 to −40 | 21.6 |
| +40 | 52.4 |

10. The method of claim 9, in which the filter medium comprises a granular, potassium-containing material selected from the group consisting of muriate of potash and sulfate of potash.

* * * * *